US008146293B2

(12) United States Patent
Brownlie, Jr. et al.

(10) Patent No.: US 8,146,293 B2
(45) Date of Patent: Apr. 3, 2012

(54) DOUBLE ACTING SNAP-IN GLASS RETENTION FOR A VEHICLE DOOR

(75) Inventors: Gavin J. Brownlie, Jr., Sterling Heights, MI (US); Terrence P. Costigan, Fenton, MI (US); John D. Caron, St. Clair Shores, MI (US); Ed Fortin, Newmarket (CA); Doug Broadhead, Brampton (CA)

(73) Assignee: GM Global Technology Operations, LLC, Detroit, MI (US)

(*) Notice: Subject to any disclaimer, the term of this patent is extended or adjusted under 35 U.S.C. 154(b) by 360 days.

(21) Appl. No.: 12/485,555

(22) Filed: Jun. 16, 2009

(65) Prior Publication Data

US 2010/0313481 A1 Dec. 16, 2010

(51) Int. Cl.
*B60J 1/16* (2006.01)

(52) U.S. Cl. .......................................................... 49/375

(58) Field of Classification Search .................... 49/372, 49/374, 375
See application file for complete search history.

(56) References Cited

U.S. PATENT DOCUMENTS 5,778,599 A * 7/1998 Saito ................................ 49/375
5,992,099 A * 11/1999 Thomas .......................... 49/375
7,430,831 B2 * 10/2008 Castellon ........................ 49/375
7,721,487 B2 * 5/2010 Costigan et al. ................ 49/375
2006/0130407 A1 * 6/2006 Castellon ........................ 49/375
2007/0006533 A1 * 1/2007 Dedrich et al. ................. 49/375
2010/0088964 A1 * 4/2010 Costigan et al. ................ 49/372

FOREIGN PATENT DOCUMENTS

WO 2008/138122 A1 11/2008

* cited by examiner

*Primary Examiner* — Jerry Redman

(74) *Attorney, Agent, or Firm* — MacMillian, Sobanski & Todd, LLC

(57) ABSTRACT

A snap-in glass carrier, engageable with a window regulator for snap fitting a door glass having a glass retention hole to the carrier, comprises a carrier base, a regulator attachment extending from the carrier base, a glass retention portion and a finger. The glass retention portion extends from the base spaced from the window regulator portion to define a gap for the glass. The finger, cantilevered from the base, includes a vertical portion extending parallel to the support finger on the same side of the glass as the support finger, a retention tab extending from the vertical portion into the gap that engages the retention hole, a hinge point adjacent to the glass carrier base and located on the same side of the gap as the window regulator attachment, and a spring leg extending through the gap from the hinge point to the vertical portion.

12 Claims, 3 Drawing Sheets

DOUBLE ACTING SNAP-IN GLASS RETENTION FOR A VEHICLE DOOR

BACKGROUND OF INVENTION

The present invention relates generally to movable windows in vehicle doors and more particularly to glass carriers for movable windows in vehicle doors.

Snap-in side glass retainers have been employed to retain movable glass in automotive vehicle doors. However, one limitation of these snap-in glass retainers is their relatively low pull out force capability, resulting in an inability to retain the glass to the retainer when the glass is frozen in its full up position and a large reversal load is input to a manual window regulator (inside crank handle) by a vehicle occupant. And, in particular, for rear side doors with single guided manual regulators (the worst case condition due to the reversal load going into a single glass retainer), the reversal loads can reach as high as 700 Newtons on the glass retainer. Thus, for these configurations, a conventional glass retention assembly with a clamp type mechanism or an assembly with a pin in the glass is employed to withstand the loading. But these types of mechanisms are generally heavier, more costly, and require more labor during assembly than is desired.

SUMMARY OF INVENTION

An embodiment contemplates a snap-in glass carrier engageable with a window regulator assembly for snap fitting a movable door glass having a glass retention hole to the snap-in glass carrier. The snap-in glass carrier may comprise a glass carrier base, a window regulator attachment portion extending from the glass carrier base, a glass retention portion and a snap finger. The glass retention portion may extend from the glass carrier base parallel to and spaced from the window regulator attachment portion to define a gap that receives the door glass therein. The snap finger, extending and cantilevered from the glass carrier base, includes a vertical portion extending parallel to the support finger on the same side of the door glass as the support finger, a retention tab extending from the vertical portion into the gap that engages the glass retention hole, a hinge point adjacent to the glass carrier base and located on the same side of the gap as the window regulator attachment portion, and a spring leg extending through the gap from the hinge point to the vertical portion, with the hinge point having a stiffness that is less than the stiffness of the vertical portion.

An embodiment contemplates a snap-in glass carrier engageable with a window regulator assembly for snap fitting a movable door glass having a glass retention hole to the snap-in glass carrier. The snap-in glass carrier may comprise a glass carrier base, a window regulator attachment portion extending from the glass carrier base, a glass retention portion and a snap finger. The glass retention portion may extend from the glass carrier base parallel to and spaced from the window regulator attachment portion to define a gap configured to receive the movable door glass therein, with the glass retention portion including a pair of support fingers extending upward from the glass carrier base to a pair of free ends and a horizontally extending support beam extending between and supported by the free ends of the support fingers. The snap finger, extending upward and cantilevered from the glass carrier base generally parallel to the support finger, may include a vertical portion extending parallel to the support finger on the same side of the door glass as the support finger, a retention tab extending from the vertical portion into the gap and configured to operatively engage the glass retention hole, a hinge point adjacent to the glass carrier base and located on the same side of the gap as the window regulator attachment portion, a spring leg extending through the gap from the hinge point to the vertical portion, and an upper glass catch extending from the snap finger away from the gap, below and engageable with the support beam when a window pull-out load is induced in the snap-in glass carrier.

An advantage of an embodiment is that the retention force for retaining the window glass to the glass carrier is significantly increased while still employing a snap-in glass capability. The snap-in glass carrier provides low insertion forces during assembly while maintaining a high pull out retention force. Moreover, the snap-in glass carrier may be molded as a single piece. And, the snap-in configuration allows for reduced assembly complexity and time versus a clamp or a pin-in-glass type of mechanism.

An advantage of an embodiment is that the snap-in glass carrier can accommodate multiple thicknesses of glass by using different mold inserts.

BRIEF DESCRIPTION OF DRAWINGS

FIG. 3 is not an exact cross section taken along line 3-3 in FIG. 2 as both FIG. 2 and FIG. 3 are perspective views, with the FIG. 3 perspective view also being partially in cross section.

DETAILED DESCRIPTION

Figure 1:
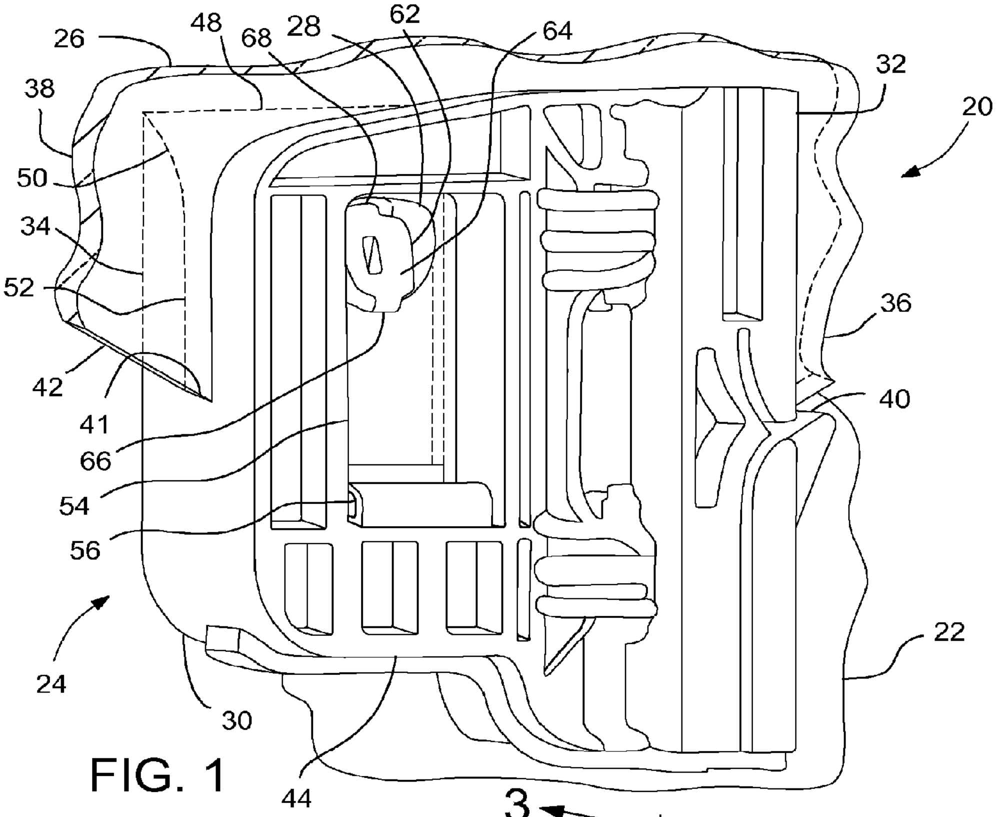
FIG. 1 is a partially schematic, perspective view of a portion of a movable window assembly for use in a vehicle door.
Figure 2:
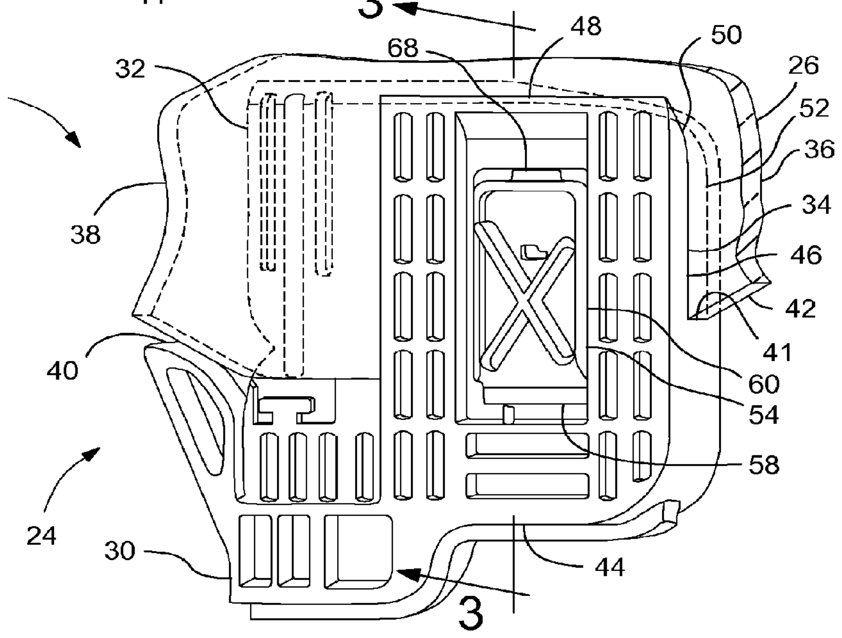
FIG. 2 is a perspective view of a snap-in glass carrier and a portion of a door glass.
Figure 3:
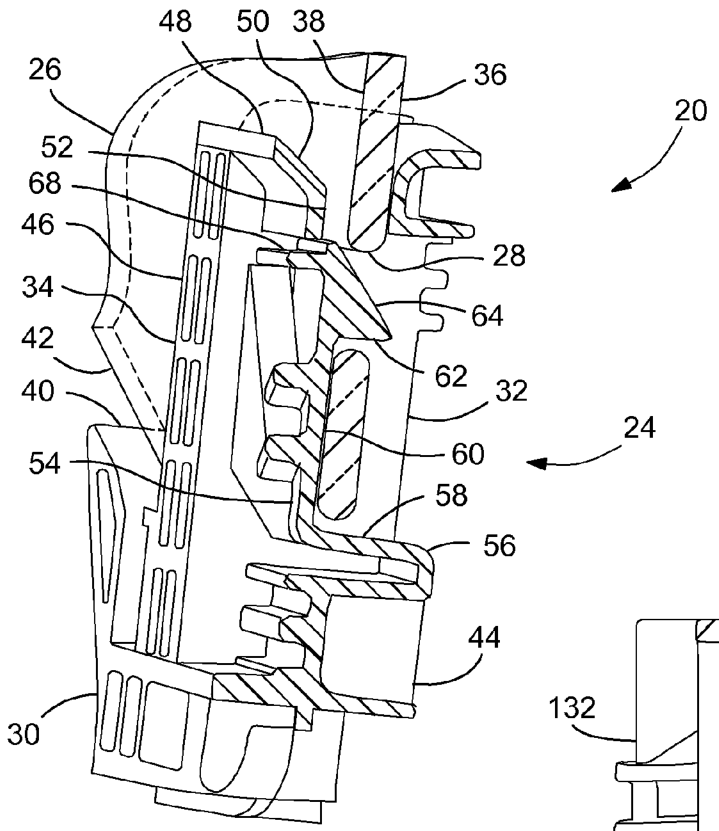
FIG. 3 is a perspective view, in partial cross section and rotated clockwise a small amount, with the partial cross section taken generally vertically through the snap finger portion (looking generally to the left as viewed along line 3-3 in FIG. 2) of the movable window assembly, showing the components of FIG. 2 from a different direction.

Referring to FIGS. 1-3, portions of a movable window assembly, indicated generally as 20, are shown. The movable window assembly 20 includes a window regulator assembly 22 (a portion of which is shown schematically in FIG. 1). A snap-in glass carrier 24 is engaged and pulled up and down by the window regulator assembly 22. A movable side door glass 26 is retained by the snap-in glass carrier 24, which causes the up and down movement of the glass 26. The glass 26 includes a glass retention hole 28, and the glass carrier 24 is configured to allow the glass 26 to slide into the glass carrier 24 until the glass retention hole 28 is engaged by the glass carrier 24. This snap-in arrangement reduces the labor needed to assemble the door.

When referring to glass herein, this may include other types materials for movable windows in vehicles, including plastics and layers of different materials used for the window. Also, while the glass 26 is discussed in reference to a side door of a vehicle, the glass 26 may be used anywhere movable glass is used on a vehicle, such as sliding doors, lift-gates, mid-gates, dropping backlights, or other similar types of locations.

The glass carrier 24 may be molded as a single, monolithic piece, if so desired, and includes a glass carrier base 30 from which a window regulator attachment portion 32 and a glass retention portion 34 extend. The glass carrier base 30 may also include a first glass support ledge 40 and a second glass support ledge 41 upon which a bottom edge 42 of the glass 26 rests.

The window regulator attachment portion 32 is configured to engage and be driven up and down by the window regulator assembly 22. The window regulator attachment portion 32 also engages a first side 36 of the glass 26. The glass retention portion 34 engages a second, opposite side 38 of the glass 26 and engages the glass retention hole 28.

The glass retention portion 34 includes a snap finger base 44, which is a portion of the glass carrier base 30, from which a pair of support fingers 46 extend upward. A horizontal support beam 48 extends between and is supported by the upper ends of the support fingers 46. The horizontal support beam 48 includes a sloped face 50 that faces the second side of the glass 38 and helps guide the bottom edge 42 of the glass 26 into a gap 52 between the window regulator attachment portion 32 and the glass retention portion 34.

The glass retention portion 34 also includes a snap finger 54 extending upward from the snap finger base 44 between the two support fingers 46. The snap finger 54 connects to the snap finger base 44 at a hinge point 56 location that is on the opposite side of the glass 26 from the support fingers 46. A spring leg 58 extends from the hinge point 56, under the bottom edge 42 of the glass 26, to a vertical portion 60 of the snap finger 54 that is on the same side of the glass 26 as the support fingers 46 and horizontal support beam 48. The vertical portion 60 is located closer to the glass than the horizontal support beam 48.

A retention tab 62 extends out from the vertical portion 60 into the gap 52. The retention tab 62 includes a tapered upper surface 64 that will cause the snap finger 54 to flex outward as the glass 26 is slid into position in the gap 52. The retention tab 62 may also include a lower glass catch 66 that extends downward from the retention tab 62 and is spaced from the vertical portion 60 a distance that is greater than the thickness of the glass 26. The retention tab 62 and lower glass catch 66 are located so that, when the glass 26 is in its installed position, the retention tab 62 will extend through the glass retention hole 28 and the lower glass catch 66 will extend over a lower edge of the glass retention hole 28. The lower glass catch 66 is optional and may be omitted, if so desired.

An upper glass catch 68 extends out from the vertical portion 60 away from the glass 26, just below the top of the vertical portion 60. The upper glass catch 68 is located just below the horizontal support beam 48, with a small gap between the two.

The assembly and operation of the movable window assembly 20 will now be discussed. The window regulator attachment portion 32 of the snap-in glass carrier 24 is attached to the window regulator assembly 22. The glass 26 is slid down from above the carrier 24. As the glass 26 is slid down, the glass 26 will be guided into the gap 52 by the curved upper edge of the window regulator attachment portion 32 and the sloped face 50 of the horizontal support beam 48.

Then, as the glass 26 slides into the gap 52, the bottom edge 42 of the glass 26 will contact the tapered upper surface 64 of the retention tab 62. Pushing the glass 26 downward further, the glass 26 will cause the snap finger 54 to flex outward, pushing the retention tab 62 out of the way. The free end at the top of the vertical portion 60 is low enough that the snap finger 54 can slide under the horizontal support beam 48, allowing the snap finger 54 to flex out of the gap 52. The vertical portion 60 of the snap finger 54 is configured to have a higher stiffness than the hinge point 56, thus with this difference in stiffness, combined with the shape of the spring leg 58 and vertical portion 60, the snap finger 54 will flex mostly at the hinge point 56, allowing for low insertion forces. As the glass 26 reaches an installed position, the retention tab 62 and lower glass catch 66 align with the glass retention hole 28 in the glass 26. The snap finger 54 will then pivot back into the gap 52, pushing the retention tab 62 and lower glass catch 66 into the glass retention hole 28. The lower glass catch 66 helps retain the retention tab 62 in the hole 28. The window glass 26 is now secured to the snap-in glass carrier 24 and can be moved up and down with the window regulator assembly 22. This arrangement allows for minimal glass installation forces.

Should a situation arise where a window down load is introduced by the window regulator assembly 22 but the glass 26 is stuck in an up (closed position), the snap-in glass carrier 24 provides for high pull-out load resistance to maintain the glass 26 in the carrier 24. That is, when a high reversal load is applied—by the window regulator assembly 22 pulling down on the snap-in glass carrier 24—the engagement of the retention tab 62 with the glass 26 will create some flexing of the snap finger 54 at the hinge point 56 since the hinge point 56 has a low relative stiffness. But, as the hinge point flexing occurs, the vertical portion 60 will raise relative to the horizontal support beam 48 and the horizontal support beam 48 will engage the upper glass catch 68 on the snap finger 54. At this point, not only will the horizontal support beam 48 help maintain the retention tab 62 in the glass 26, it will also support the snap finger 54 in absorbing the significant window reversal loads. The vertical load, rather than all of it going through the spring leg 58 and hinge point 56, can now mostly travel through the horizontal support beam 48, through the support fingers 46, and to the glass carrier base 30. And, since the horizontal support beam 48, support fingers 46 and base 30 do not have to flex during installation, they can be made much more sturdy and stiff than the snap finger 54 (especially at the hinge point 56). This greatly increases the glass retention load capability of the snap-in glass carrier 24.

The hinge point 56 being located on the opposite side of the glass 26 from the vertical portion 60 of the snap finger 54 helps ensure that the snap finger 54 remains engaged with the glass 26 during a high reversal load event.

Figure 6:
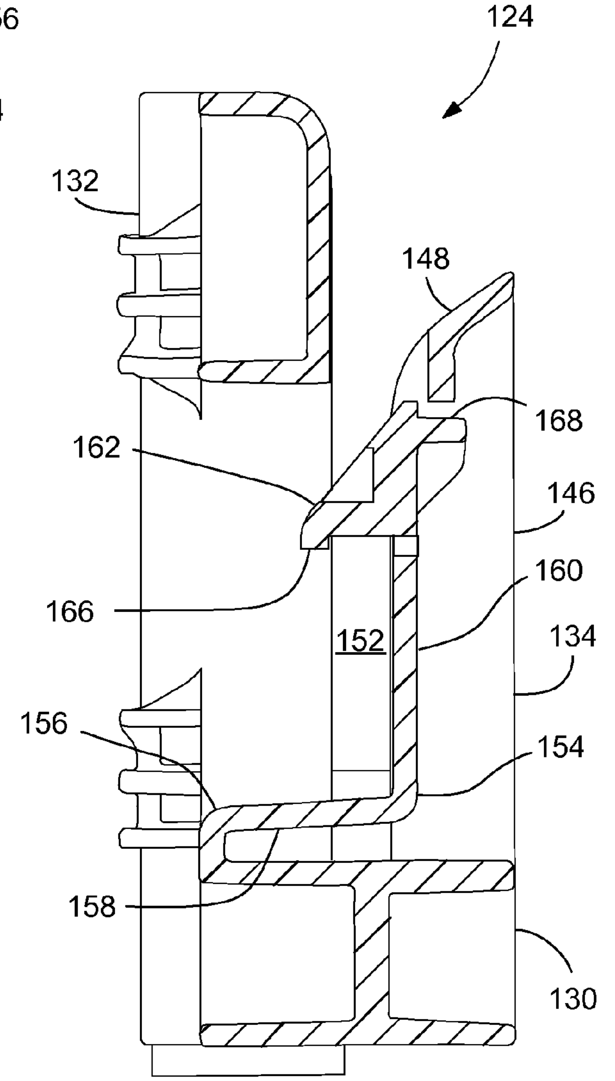
FIG. 6 is an elevation view, in partial cross section, taken vertically through the snap finger portion (looking to the right as viewed along line 6-6 in FIG. 5) of the snap-in glass carrier according to the second embodiment.
Figure 4:
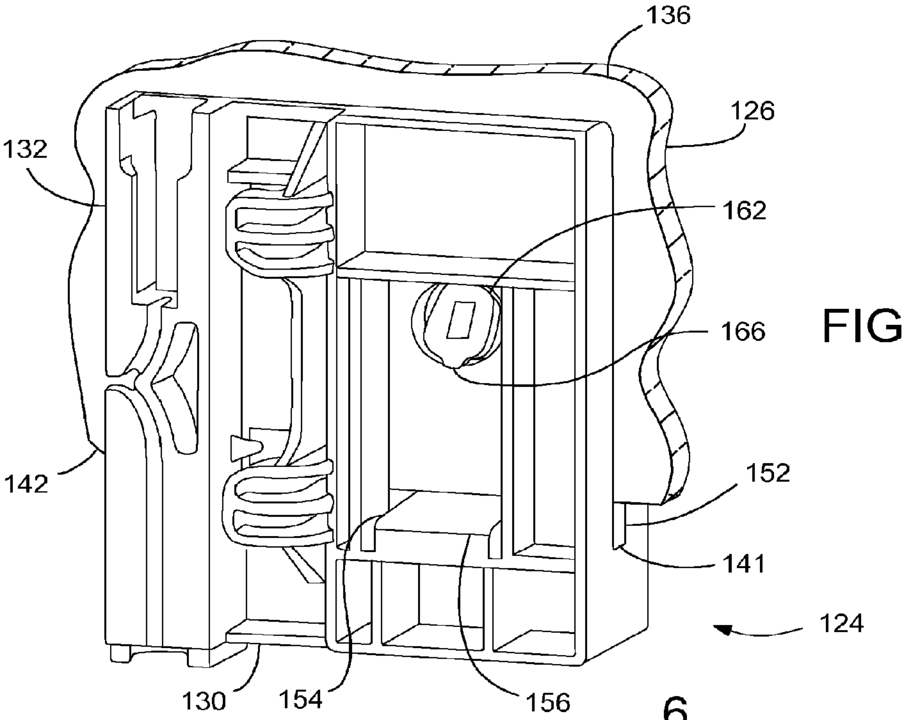
FIG. 4 is a perspective view of a snap-in glass carrier and a portion of a door glass according to a second embodiment.
Figure 5:
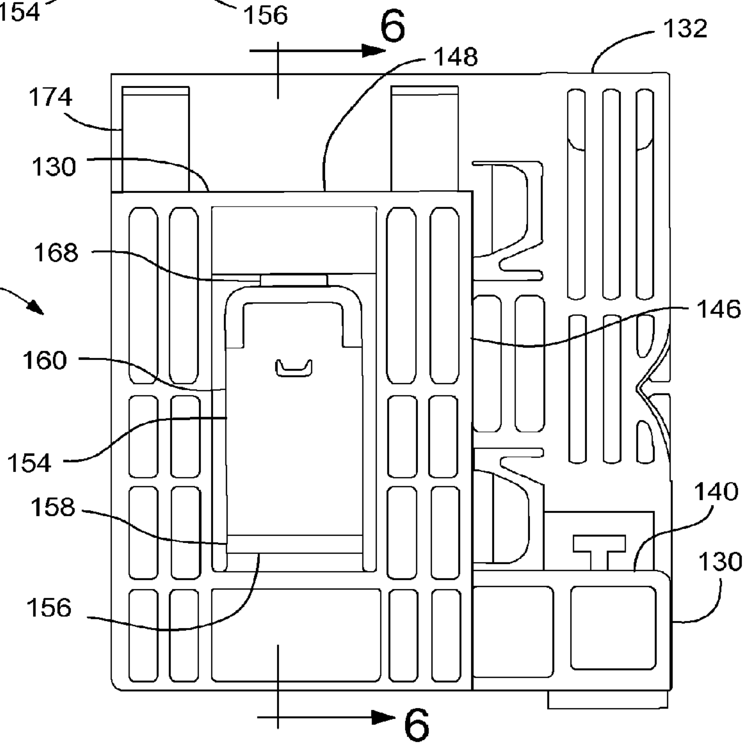
FIG. 5 is a side, elevation view of the snap-in glass carrier according to the second embodiment.

FIGS. 4-6 illustrate a second embodiment. Since this embodiment is similar to the first, similar element numbers will be used for similar elements, but employing 100-series numbers. In this embodiment, the snap-in glass carrier 124 still retains a door glass 126 in a gap 152 between a window regulator attachment portion 132 and a glass retention portion 134 that extend from a glass carrier base 130. A snap finger 154 still includes a hinge point 156 that is much less stiff and is located on the opposite side of the glass 126 from a vertical portion 160, with a spring leg 158 connecting the two. A retention tab 162 extends from the vertical portion 160 into the gap 152 and may include an optional lower glass catch 166 spaced from the vertical portion 160. An upper glass catch 168 extends from the vertical portion 160 just below a horizontal support beam 148 that extends between a pair of support fingers 146.

The first glass support ledge 140 and second glass support ledge 141 may be oriented differently than in the first embodiment in order to accommodate a different shaped bottom edge 142 of the glass 126. Also, the various lightening recesses and stiffening flanges (not numbered) may be somewhat changed from the first embodiment, but do not effect the overall assembly or operation of the snap-in glass carrier 124, as described relative to the first embodiment.

A feature shown in this embodiment, which can be employed in the first embodiment as well, is a pair of glass thickness adjustment pads 174 (shown in FIG. 5). The adjustment pads 174 extend into the gap 152 from the window regulator attachment portion 132. Thus, the adjustment pads 174 help to determine the effective width of the gap 152 because the first side of the glass 136 rests against these pads 174, with thicker pads 174 pushing the glass 126 toward the glass retention portion 134. Matching the gap width to the glass thickness is desirable, but having a completely separate design of snap-in glass carriers for each glass thickness is not desirable. By employing these adjustment pads 174, merely changing mold inserts will allow for a variation in the pad thickness, thus accommodating multiple glass thicknesses without changing the snap-in glass carrier design.

While certain embodiments of the present invention have been described in detail, those familiar with the art to which this invention relates will recognize various alternative designs and embodiments for practicing the invention as defined by the following claims.

What is claimed is:

1. A snap-in glass carrier engageable with a window regulator assembly for snap fitting a movable door glass having a glass retention hole to the snap-in glass carrier, the snap-in glass carrier comprising:

a glass carrier base;

a window regulator attachment portion extending from the glass carrier base;

a glass retention portion extending from the glass carrier base parallel to and spaced from the window regulator attachment portion to define a gap configured to receive the door glass therein; and a snap finger, extending and cantilevered from the glass carrier base, including a vertical portion extending parallel to a support finger on a same side of the door glass as the support finger, a retention tab extending from the vertical portion into the gap and configured to operatively engage the glass retention hole, a hinge point adjacent to the glass carrier base and located on the same side of the gap as the window regulator attachment portion, and a spring leg extending through the gap from the hinge point to the vertical portion, the hinge point having a stiffness that is less than the stiffness of the vertical portion.

2. The snap-in glass carrier of claim 1 wherein the glass retention portion includes a pair of support fingers extending from the glass carrier base to a pair of free ends and a support beam extending between and supported by the pair of free ends of the support fingers, and an upper glass catch extending from the vertical portion away from the gap, adjacent to and engageable with the support beam when a window pull-out load is induced in the snap-in glass carrier.

3. The snap-in glass carrier of claim 2 wherein the support beam includes a sloped surface facing away from the glass carrier base that extends toward the gap as the sloped surface extends toward the glass carrier base.

4. The snap-in glass carrier of claim 1 wherein the retention tab includes a lower glass catch extending toward the glass carrier base from the retention tab, the lower glass catch being configured to engage with an edge of the glass retention hole.

5. The snap-in glass carrier of claim 1 wherein the retention tab includes a tapered surface facing away from the glass carrier base that tapers toward the glass carrier base as the retention tab extends outward into the gap.

6. The snap-in glass carrier of claim 1 wherein the window regulator attachment portion includes a glass thickness adjustment pad extending into the gap to define a width of the gap between the glass thickness adjustment pad and the glass retention portion.

7. A snap-in glass carrier engageable with a window regulator assembly for snap fitting a movable door glass having a glass retention hole to the snap-in glass carrier, the snap-in glass carrier comprising:

a glass carrier base;

a window regulator attachment portion extending from the glass carrier base;

a glass retention portion extending from the glass carrier base parallel to and spaced from the window regulator attachment portion to define a gap configured to receive the movable door glass therein, the glass retention portion including a pair of support fingers extending upward from the glass carrier base to a pair of free ends and a horizontally extending support beam extending between and supported by the free ends of the support fingers; and a snap finger, extending upward and cantilevered from the glass carrier base generally parallel to the support finger, including a vertical portion extending parallel to the support finger on a same side of the door glass as the support finger, a retention tab extending from the vertical portion into the gap and configured to operatively engage the glass retention hole, a hinge point adjacent to the glass carrier base and located on the same side of the gap as the window regulator attachment portion, a spring leg extending through the gap from the hinge point to the vertical portion, and an upper glass catch extending from the snap finger away from the gap, below and engageable with the support beam when a window pull-out load is induced in the snap-in glass carrier.

8. The snap-in glass carrier of claim 7 wherein the retention tab includes a tapered surface facing upward that tapers downward as the retention tab extends outward into the gap.

9. The snap-in glass carrier of claim 7 wherein the retention tab includes a lower glass catch extending downward from the retention tab, the lower glass catch being configured to engage with a lower edge of the glass retention hole.

10. The snap-in glass carrier of claim 7 wherein the support beam includes a sloped surface facing upward that extends toward the gap as the sloped surface extends downward.

11. The snap-in glass carrier of claim 7 wherein the window regulator attachment portion includes a glass thickness adjustment pad extending into the gap to define a width of the gap between the glass thickness adjustment pad and the glass retention portion.

12. The snap-in glass carrier of claim 7 wherein the vertical portion includes a free end and the upper glass catch extends from the snap finger adjacent to and below the free end.

* * * * *